United States Patent [19]

Sutekiyo

[11] Patent Number: 4,625,681
[45] Date of Patent: Dec. 2, 1986

[54] METHOD OF OBTAINING MECHANICAL ENERGY UTILIZING H₂O PLASMA GENERATED IN MULTIPLE STEPS

[75] Inventor: Uozumi Sutekiyo, Hachiogi, Japan

[73] Assignee: Sutabiraiza Company, Limited, Saitama, Japan

[21] Appl. No.: 699,404

[22] Filed: Feb. 7, 1985

[30] Foreign Application Priority Data

Feb. 10, 1984 [JP] Japan .................................. 59-21987

[51] Int. Cl.⁴ ............................................ F02B 43/08
[52] U.S. Cl. .................................. 123/3; 123/DIG. 12
[58] Field of Search ................. 123/3, DIG. 12, 536, 123/537

[56] References Cited

U.S. PATENT DOCUMENTS 4,297,983 11/1981 Ward .................................... 123/536

Primary Examiner—E. Rollins Cross
Attorney, Agent, or Firm—Spencer & Frank

[57] ABSTRACT

A method of obtaining mechanical energy utilizing H₂O-plasma that is generated in multiple steps. The general field of art of the invention is that of producing a reactive thrust by using plasma. The mechanical energy provided by the invention is produced by explosion of electrically conductive plasma which is generated by dissociating H₂O. At the first step H₂O (gas) produced by a gasifier is reduced to a plasmatic state by electrical discharge. At the second step the plasmatic gas is treated by a further and stronger electrical discharge and by high-frequency induction heating, and the energy level of the plasma is raised to a point at which a plasma jet is ready to be produced. At the third step, the plasma jet is generated by periodically modulating the high voltage for the second electrical discharge, and a high-pressure thermal explosion reaction is caused by synchronizing the generation with compression of the plasma jet. The result is that energy produced by the plasmatic reaction in the plasma jet at ultra-high temperature is converted to mechanical energy.

6 Claims, 7 Drawing Figures

METHOD OF OBTAINING MECHANICAL ENERGY UTILIZING H₂O PLASMA GENERATED IN MULTIPLE STEPS

BACKGROUND OF THE INVENTION

The field of art to which the present invention pertains is "Using plasma to produce a reactive propulsive thrust," classified F03H 1/00 in the International Classification.

The present invention relates to novel subject matter without precedent in the prior art. Today, gasoline occupies an important position as a material to produce mechanical energy; however the use thereof entails high cost, and the waste produced from the use causes environmental pollution. Various efforts have been made to eliminate or reduce such pollution for the maintenance of human health, but as of yet no effort that has been made to cope with these problems has resulted in radically alternative means.

BRIEF SUMMARY OF THE INVENTION

This invention relates to a method of obtaining mechanical energy, wherein $H_2O(g)$ (that is, $H_2O$ gas) is generated from $H_2O(l)$ (liquid) by a gasifier, and the $H_2O(g)$ is thereafter dissociated by multi-step electrical discharge and induction heating to generate an electrically conductive plasma confined in a cylinder. A concentration of reactive free radicals in the plasma is subsequently treated by means of time gate modulation of a high voltage for the discharge at the final step to periodically produce a plasma jet having a temperature of thousands of degrees of Kelvin (°K.) at the center of the cylinder. The degree of dissociation then sharply increases, and the plasma is compressed and ignited in synchronization therewith to induce an explosive reaction to obtain mechanical energy.

It is an object of the invention to provide a method to obtain mechanical energy using $H_2O$ as a reactive intermediary.

Another object of the invention is to provide a method to obtain mechanical energy utilizing a substance whose product materials in a combustion reaction are completely free from pollution.

A further object of the invention is to provide a method to obtain mechanical energy in which a thermal explosion reaction is caused using only hydrogen and oxygen produced by dissociation of $H_2O$.

The above and further objects and novel features of this invention will more fully appear from the following detailed description when the same is read in connection with the accompanying drawings, which are however only for the purpose of illustration and are not intended to limit scope of the invention.

DETAILED DESCRIPTION OF THE INVENTION

Generally, when oxygen is mixed with combustible gas and a part of the gas mixture is ignited, a reaction will take place uniformly in the gas mixture, and the reaction speed, that is, the heat generation rate, is remarkably high. On the other hand the heat is dispersed in a gas of low heat conductivity, so the heat generation rate is always higher than the heat dispersion rate. This reaction may be identified as "unsteady-state combustion" and, as the materials produced by the combustion are always gas or vapor, the unsteady-state combustion causes an explosion. Oxy-hydrogen detonating gas explosions and vaporized gasoline/air mixture explosions are of this type. Such explosions arise when the rate of heat generation by the combustion exceeds the rate of heat dispersion, so that for an explosion there exists a certain limit on the composition of a gas mixture.

Figure 1:
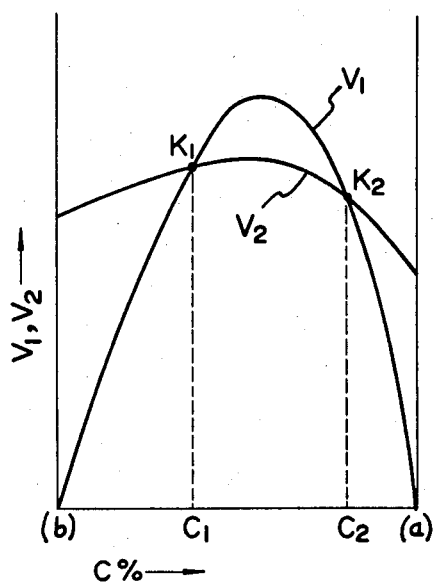
FIG. 1 is a schematic diagram presented for assistance in explaining the relationship between the heat generation rate $V_1$ and the heat dispersion rate $V_2$ in an explosion of a gas mixture.

FIG. 1 is a basic explanatory graph showing the relationship between the rate of heat generation ($V_1$) and the rate of heat dispersion ($V_2$) when an explosion takes place in a mixture of a combustible gas A and a gas B. The X-axis represents the concentration C of combustible gas A contained in the gas mixture, this concentration increasing from left to right. At the left end point (b) on the X-axis, the concentration C of gas A is 0% (so that gas B, such as oxygen or air, is present at 100%), and at the right end point (a) on the axis, the concentration C of the combustible gas, for example, hydrogen, gasoline etc. is 100%. The reaction speed, that is, the heat generation rate, is 0 at points (a) and (b), where the concentration of the combustible gas is respectively 0% and 100%, and therefore both ends of the curve ($V_1$) are at the zero point on the Y-axis (rate). The curve ($V_1$) must reach its maximum at a certain point between these end points. On the other hand heat dispersion takes place even when gas A or gas B is at 100%, so the relationship between the composition of the gas mixture and the heat dispersion rate can be shown by the curve ($V_2$), which must cross the curve ($V_1$) at certain points within a certain range on the Y-axis and between the end points (a) and (b) on the X-axis. At a given temperature, assuming that the relative position of the heat generation curve ($V_1$) and the heat dispersion curve ($V_2$) is as indicated in the FIG. 1, the curves cross each other at two points $K_1$ and $K_2$, and the heat generation rate ($V_1$) is above the heat dispersion rate ($V_2$) at all points between points $K_1$ and $K_2$, which correspond respectively to concentrations $C_1$ and $C_2$ of combustible gas. Therefore, at such temperature as described above, the use of a gas mixture having a composition falling between $C_1$ and $C_2$ will cause an explosion, and such temperature corresponds to the ignition temperature, or triggering temperature for a gas mixture having the composition shown by $C_1$ and $C_2$. As a practical matter, the temperature which causes ignition in various gas mixtures is near red heat (773° K.~873° K., where °K. indicates degrees Kelvin). It can be said that each gas mixture has a peculiar range of combustion composition of its own.

Since the combustible gas A described above is hydrogen in the present invention, the explosion range of hydrogen will be described. The explosive range of hydrogen gas mixed with air is $C_1 \approx 4\% \sim C_2 \approx 75\%$ in volume % (physics class 162 (578) P, "the Book of Chronological Scientific Data" published by Maruzen K. K., 1982). It is to be noted here that, at composition $C_2$, the upper limit for explosion, there is not enough oxygen to cause complete combustion of the hydrogen so long as air is used in the gas mixture. Because air is only one fifth oxygen by volume, it is easily understood from simple computation that the hydrogen concentration must be at about 30% or less in order for air, mixed with hydrogen, to completely turn the hydrogen to water after combustion. Comparison of this volume with the above-mentioned upper limit of hydrogen concentration ($C_2 \approx 75\%$) shows that the use of air as a source of oxygen allows complete combustion of hydrogen during a gas explosion reaction only when the hydrogen concentration is less than about 30%, and that there would be an oxygen deficiency in the range above that hydrogen concentration. However, it is troublesome, costly, and above all, dangerous, to use containers as a source of hydrogen or oxygen. In regard to this point, the process according to the present invention, in which $H_2O$ is utilized, is characterized in that hydrogen and oxygen are rapidly dissociated from the $H_2O$ at an ultra-high temperature which is produced in a plasma jet generated at the final step in a multi-step plasma generation process (see the subsequent Table) and the plasma jet is compressed and ignited in a synchronized manner with the dissociation to cause an explosion reaction in which oxygen is supplied neither from atmospheric air nor from oxygen containers but from water, to induce an oxy-hydrogen explosion reaction to obtain mechanical energy.

Figure 2:
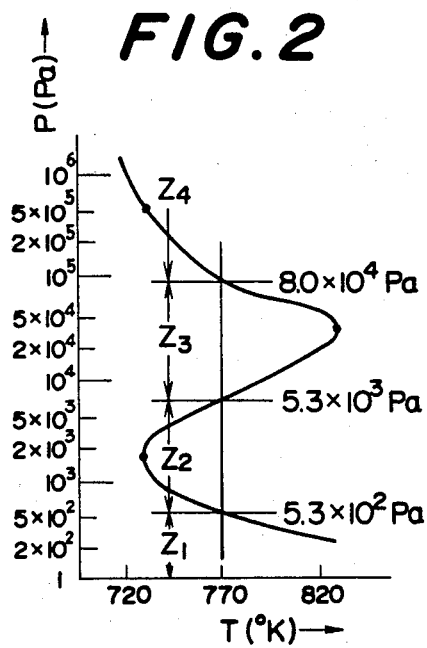
FIG. 2 is a diagram illustrating characteristics in the relationship between temperature T (°K.) and pressure P (Pa) in a hydrogen explosion.

Now resuming the explanation of a mechanism in which an oxy-hydrogen explosion is caused, FIG. 2 is a brief explanatory graph illustrating the temperature T (in °K.) vs. pressure P (in Pascals, Pa) characteristics of an oxy-hydrogen explosion (two volumes hydrogen, one volume oxygen) in a container of glass. The detonation reaction can be expressed with the simple reaction formula $2H_2 + O_2 \rightarrow 2H_2O$, in which much heat of reaction is produced, that is, $$2H_2(g) + O_2(g) \rightarrow 2H_2O(g) + 115.6 \text{ Kcal} \qquad (1)$$

In this case, the heat generated amounts to more than twice that of gasoline per gram. The reaction may seem simple at first glance, however the mechanism itself is a complicated chain reaction involving the free radicals H., O. and .OH. The characteristic curve taken at temperature $T \approx 770°$ K. in FIG. 2 indicates that no explosion occurs when the pressure P is in zone $Z_1$, below about $5.3 \times 10^2$ Pa. What is called a low pressure explosion takes place in zone $Z_2$, from zone $Z_1$ to about $5.3 \times 10^3$ Pa. No explosion occurs in zone $Z_3$, from zone $Z_2$ to about $8.0 \times 10^4$ Pa. However, when the pressure P exceeds this latter figure, i.e., in zone $Z_4$, a high-pressure explosion (also called a thermal explosion) occurs.

In a thermal explosion, the speed of the reaction increases rapidly, and the heat generation rate also increases rapidly at a certain temperature in proportion to the increase of the pressure. The explosions in the present invention relate to explosions taking place in zone $Z_4$.

Now, at the start of a chain reaction:

$$H_2 \rightarrow 2H. \qquad (2) \text{ or}$$

$$H_2 + O_2 \rightarrow HO_2 + H. \qquad (3)$$

and during propagation of the chain reaction:

$$H. + O_2 \rightarrow .HO_2 \qquad (4)$$

$$.HO_2 + H_2 \rightarrow .OH + H_2O \qquad (5)$$

$$.OH + H_2 \rightarrow H_2O + H. \qquad (6)$$

In the above reaction only one free radical is produced from a free radical which serves as a messenger in the chain reaction (referred to as MR for short, for Messenger Radical) and neither branching in the chain reaction nor an explosion will take place. However when the following reaction takes place, two free radicals are produced from each MR:

$$H. + O_2 \rightarrow .OH + O. \qquad (7)$$

$$O. + H_2 \rightarrow .OH + H. \qquad (8)$$

The newly-born MRs are H., O. and .OH, which causes a branching propagation in the chain reaction leading to an explosion reaction. Propagation of the explosion is caused for the most part by adiabatic compression.

The termination of the chain reaction will now be described. In gas, a chain reaction is cut off by collision of MRs with each other or by reaction, if any, between MRs and the material of the walls of a container.

$$H. + H. \rightarrow H_2 \qquad (9)$$

$$.OH + H. \rightarrow H_2O \qquad (10)$$

$$O. + O. \rightarrow O_2 \qquad (11).$$

The substances produced by reaction between MRs and the walls of a ceramic container can, for the most part, be disregarded. It can be said that a high pressure explosion results when the dispersion speed of what is called thermal molecules, atoms and free radicals with large kinetic energy, is slower than the appropriate cutoff speed of the chain reaction. The fact that the explosion reaction of oxy-hydrogen gas occurs via the above-mentioned chain reaction mechanism and the fact that the reaction is initiated by free radicals of hydrogen H. can be confirmed by causing hydrogen to burn or explode when H. that is produced in a different manner, for example, by a luminescent discharge in hydrogen gas, is introduced into a mixture of hydrogen/oxygen gas.

Figure 3:
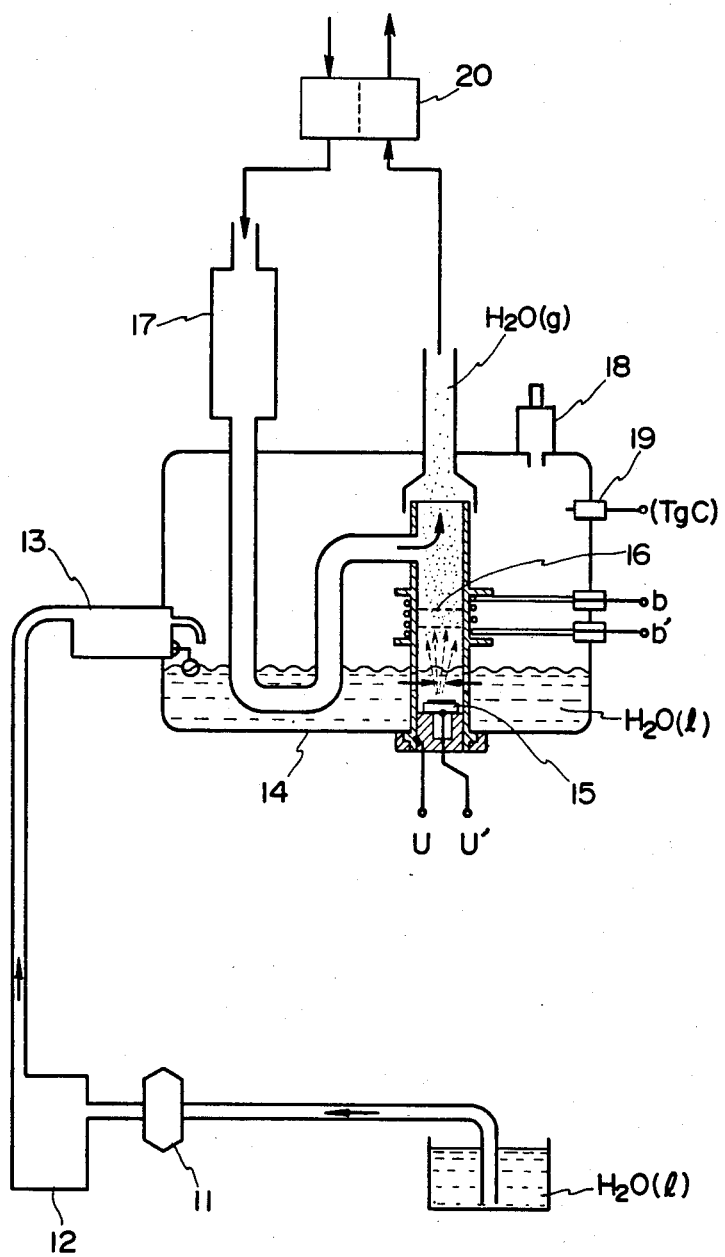
FIG. 3 is a schematic vertical sectional view of an example of a gasifier used to produce $H_2O(g)$ from $H_2O(l)$ during an initial step.

FIG. 3 is an explanatory diagram showing an example of a gasifier 14 in which $H_2O(g)$ (that is, $H_2O$ gas, or steam) is generated from $H_2O(l)$ (that is, liquid water) at the initial step in the present invention. $H_2O$ is led from an $H_2O(l)$ tank to a fixed water level automatic control valve 13 through filter 11 by means of pump 12, thus supplying gasifier 14 with H₂O(l). An ultra-sonic spray generator is provided in the gasifier and ultrasonic transducer 15 is driven to spray H₂O(l) upwards by providing ultrasonic frequency energy to terminals U and U'. Heating W-net 16 is disposed in the spray of H₂O(l) in order to rapidly gasify particles of H₂O(l) prior to the operation of the gasifier, and high frequency energy is applied for induction heating through terminals b and b'. The spray is rapidly turned into H₂O(g) which is in turn led to the intake of a turbo-supercharger 20. Once the equipment is put into operation, the exhaust is returned from the turbo-supercharger 20 to the gasifier 14 through a muffler 17, the waste heat of the exhaust heats H₂O(l) in the gasifier, and the exhaust joins the flow of the above-mentioned gasified H₂O(g) thereby to increase the temperature of the H₂O(g). The exhaust, being made up of H₂O(g) for the most part, can be utilized to increase thermal efficiency by circulating the exhaust onto the supply side. Pressure relief valve 18 is provided for keeping the pressure at a safe level, the pressure being increased as the temperature of the H₂O(g) increases. Also temperature measuring probe 19 is provided to obtain information necessary for electronically controlling the high frequency energy supplied for induction heating to appropriately control the temperature.

Figure 4:
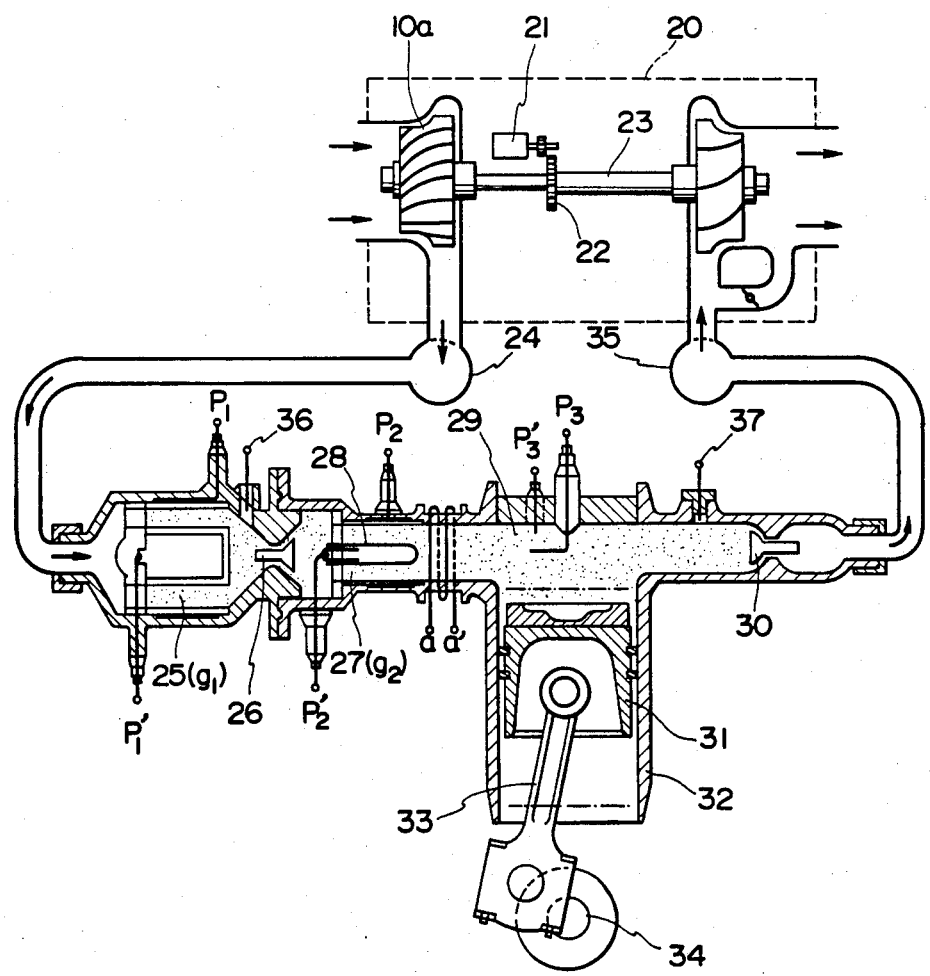
FIG. 4 is a vertical, partially fragmentary schematic view of an example of a device for carrying out the present invention, and illustrates a turbo-engine thermally insulated by a ceramic compound.

FIG. 4 is a schematic diagram of a ceramic-compound turbo adiabatic engine system designed as an example of a device for carrying out the present invention.

When electric connection is effected with both gasifier 14 referred to in the description of FIG. 3 and turbo-fan axis drive-motor 21 of turbo-supercharger 20 in FIG. 4, the pinion gear of turbo-fan axis drive-motor 21 comes out and engages ring gear 22 mounted on the shaft 23 of the turbo-fan, thereby rotating the turbo-fan and drawing H₂O(g) from the gasifier into intake-fan $10a$ and thence into a first discharge section $25(g_1)$ via intake manifold 24. A high voltage waveform $HV_1$, of repetition frequency $f_1$ (Hz), pulse height $|h_1|$ (Kv), and discharge constant $\tau_1$ (sec), is impressed between terminals $P_1$ and $P_1'$. This causes an atmospheric discharge across a gap $g_1$ (not specifically identified in FIG. 4) in the first discharge section $25(g_1)$, which generates an anisothermal plasma (electron temperature Te>ion temperature Ti≈gas temperature) at the first step. The plasma is in turn conveyed to a second discharge section 27 through intake valve 26. The intake valve 26 may be closed prior to operation, depending upon the position at which piston 31 linked with connecting rod 33 stops, in which case plasma generated in the first discharge section $25(g_1)$ stagnates in front of intake valve 26 before valve 26 is opened by pressure of the plasma. The second discharge section $27(g_2)$ has a gap $g_2$ (not specifically identified in FIG. 4) between a conductor 28, which is mounted behind intake valve 26 and along the axis of a cylindrical portion extending from ceramic cylinder 32, and an electrode in the inner wall of the ceramic cylinder. An unmodulated high voltage waveform $HV_2$, of repetition frequency $f_2$ (Hz), pulse height $|h_2|$ (KV), and discharge constant $\tau_2$ (sec), is impressed between terminals $P_2$ and $P_2'$ simultaneously with the initiation of the first discharge. Thus an atmospheric discharge is initiated by high voltage in the second discharge section $27(g_2)$ too, so that a second step of anisothermal plasma generation takes place. In an anisothermal plasma of H₂O(g), the reactive free radicals H., O. and .HO are produced together with the ions H₂O⁺, H₃O⁺, OH⁺, H⁺, which predominate quantatively, and the ions H⁻, O⁻, OH⁻ as intermediate products. The discharges are conducted with $$\frac{|h_2|}{g_2} > \frac{|h_1|}{g_1}$$

in order that the plasma energy at the second step will be more intense than the plasma energy at the first step. To provide a pool effect in generating radicals in the plasma at the first step, $$f_1 \geq f_2 \tag{12}$$

$$\tau_1 > \tau_2 \tag{13}$$

$\tau_2$ is set on the order of $10^{-7}$ seconds in order to avoid the possibility of an uncontrolled explosion, in the second discharge section.

Simultaneously with the discharge, the plasma (which is conductive) in front of conductor 28 in the second discharge section $27(g_2)$ is inductively heated using high-frequency waves of frequency $f_i$ (Hz) (preferably with $f_i$ being on the order of $10^8$ Hz) to increase the temperature of the plasma at the center of plasma jet generator 29, which lies in front of conductor 28, to a controlled temperature level $(Tg_3)$s that is determined immediately before the generation of the plasma jet. The frequency $f_i$ is preferably on the order of $10^8$ Hz because such frequencies promote gas ionization by trapping electrons as well as making non-electrode discharge possible at the same time. Terminals a and a' receive the high-frequency $f_i$ (Hz) induction heating energy from outside of the ceramic tube. In the steps so far described, a starting switch (not illustrated) for rotating crank shaft 34 has not been turned on; that is, the steps so far described are preparation which is followed by operational steps.

A fly wheel (not illustrated) is disposed at one end of crank shaft 34 and a ring gear (not illustrated) is mounted on the outer side thereof. When the starting switch is turned on, a motor (not illustrated) starts rotating and a pinion gear driven by the motor engages the ring gear to rotate crank shaft 34. The other end of crankshaft 34 is provided with a crankshaft gear (not illustrated) which is rotated by the crankshaft and which engages a camshaft gear (not illustrated). When the camshaft rotates, intake and exhaust valves (not illustrated) are driven by means of the cam (not illustrated) attached thereto. Since this mechanical operation is not related to the present invention and belongs to the field of known art and can be designed in various ways, a detailed presentation has not been made in FIG. 4.

Figure 5:
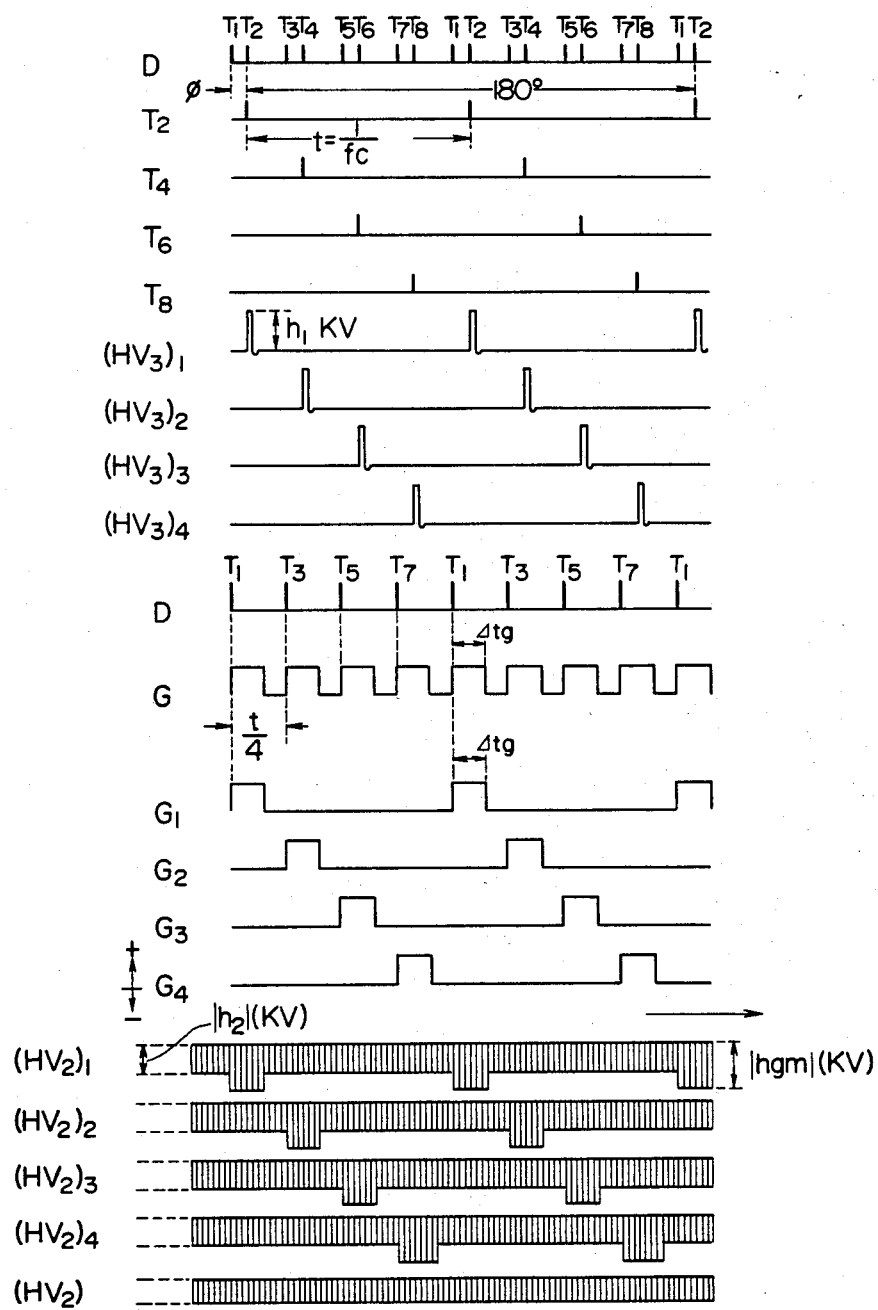
FIG. 5 is a group of waveform diagrams illustrating the correlations and timing of a series of external pulse signals to operate the system and a series of gate modulation pulse signals for controlling the plasma jet, etc., in a four-cycle engine having elements of the form illustrated in FIG. 4.
Figure 6:
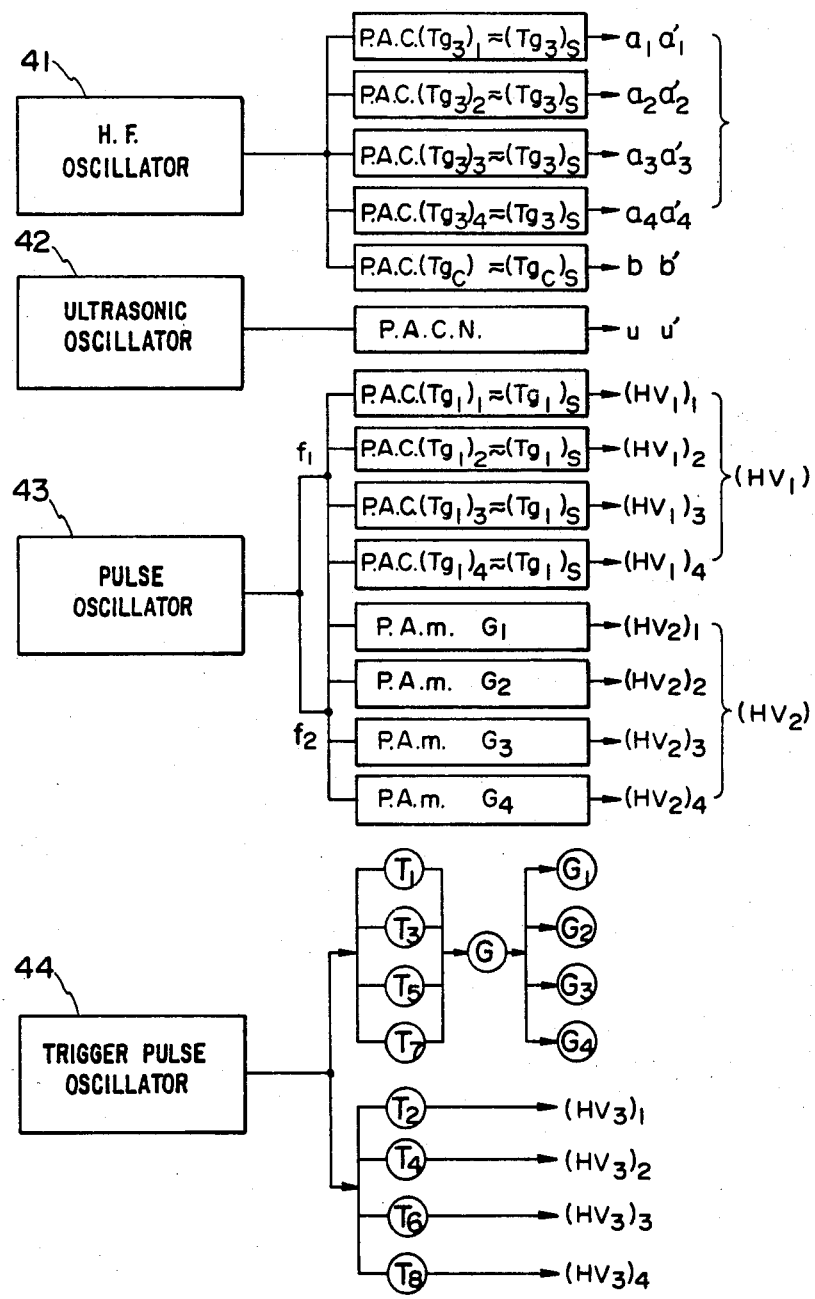
FIG. 6 is a schematic diagram of one form of an electronic system which can be employed with a four-cycle engine having elements of the form illustrated in FIG. 4.

With reference next to FIGS. 4-6, the movement of a distributor cam (not illustrated) linked to crankshaft 34 produces trigger pulses D when crankshaft 34 is rotated. A gate G provides an output with a variable pulse width starting from the position in time of the appropriate preceding phase $\phi$ to the ignition time of supplemental ignition plugs $P_3$ and $P_3'$ mounted on the cylinder. Gate G makes $G_1$, $G_2$, $G_4$ (for a four cylinder engine) control each cylinder. With this, the high voltage waveform $HV_2$, which has not been modulated before operation, increases its peak value by gate modulation from $|h_2|$ (KV) to $|H_{gm}|$ (KV) ($(HV_2)_1$, $(HV_2)_2$, $(HV_2)_3$, and $(HV_2)_4$ in FIG. 5). The temperature of plasma electrons in the second discharge section 27 of the ceramic cylinder is then increased by impulses periodically to rapidly increase the concentration of reactive free radicals, and the plasma thus generated subsequently jets forward into a high frequency thermal plasma gas portion in front of conductor 28 (FIG. 4), thereby generating a gate-controlled plasma jet with a core temperature registering in the thousands degrees Kelvin (°K.). In the thermal plasma jet of several thousand degree Kelvin (°K.), the thermal dissociation reactions $H_2 \rightleftarrows 2H$ and $O_2 \rightleftarrows 2O$ occur, and the degree of dissociation of H-atoms and O-atoms has been computed to reach the levels shown in the following Table:

TABLE

| Temperature of plasma | 1,000 | 2,000 | 3,000 | 4,000 | 5,000 (°K) |
|---|---|---|---|---|---|
| Dissociation degree of H | $1.3 \times 10^{-9}$ | $8.8 \times 10^{-7}$ | $8.3 \times 10^{-2}$ | $63 \times 10^{-2}$ | $95 \times 10^{-2}$ |
| Dissociation degree of O | $9.0 \times 10^{-11}$ | $3.6 \times 10^{-4}$ | $5.9 \times 10^{-2}$ | $60 \times 10^{-2}$ | $96 \times 10^{-2}$ |

That is, as will be understood from the Table, the oxy-hydrogen explosion range is realized when the temperature of the plasma registers 3,000° K. and over.

Now the thermal pinch effect in the plasma jet in the ceramic cylinder will be explained. Since the plasma in the cylinder is of lower temperature in the outer part thereof due to the inflow of the intake gas, ionization of the gas is diminished at the outer surface of the plasma, thereby reducing the electric conductivity. That is, the electric resistance is increased. Thus the electric current is concentrated towards the core part of the plasma and increases the temperature therein. Such increased temperature promotes ionization of gas and the electric conductivity of the plasma is increasingly augmented to produce larger heating effects—this is what is called the "thermal pinch effect". The temperature in the plasma is further raised owing to the magnetic pinch effect by the induced magnetic field, so that the plasma then shrinks and an ultra-high temperature is produced in the thermal plasma. In FIG. 4, reference number 36 identifies a temperature measure probe ($T_{g1}$) and reference number 37 identifies a temperature measure probe ($T_{g3}$) respectively.

As will be understood from FIG. 5, the above-mentioned gate-controlled plasma jet can be generated at a repetition frequency $f_c$ (Hz), where $$f_c = \frac{2}{N} \text{ (Hz)} \tag{14}$$

for a four-cycle engine (an "engine" hereinafter means a four-cycle engine except when otherwise specified). In formula (14), N (r.p.s.) represents the number of rotations of crankshaft 34 per second. In the case of a two-cycle engine, formula (14) becomes $$f_c = \frac{1}{N} \text{ (Hz)} \tag{14'}$$

At this step, the repetition of the explosion can be electronically controlled by synchronizing the compression and ignition with the repetition frequency $f_c$ (Hz). In this way, the engine starts to operate. A high voltage waveform $HV_3$, having a pulse height greater than 10 KV and a discharge constant $\tau_3$, where $\tau_1 > \tau_3 >> \tau_2$, is supplied to supplementary ignition plugs $P_3$ and $P_3'$ in FIG. 4 to assist compression when the engine starts.

Thereafter the waveform $HV_3$ is discontinued and the engine remains operative only by compression of the plasma jet. Exhaust gas produced in the process according to the present invention is made up mainly of $H_2O(g)$ containing waste heat, and this is exhausted by exhaust valve 30 and is conducted through exhaust manifold 35 to operate the turbo supercharger 20. Thereafter the exhaust gas is eventually introduced to gasifier 14 through muffler 17 as shown in FIG. 3 to provide the waste heat to the gasifier and to supply $H_2O(g)$. When the engine starts and turbo fan shaft 23 of turbo supercharger 20 begins to rotate (FIG. 4), turbo-fan axis drive motor 21 is turned off to automatically disengage the pinion gear from ring gear 22.

A description of the time range $\Delta tg$ of the modulation gate according to the method of this invention will now be given. In the aforesaid formula (14), when the maximum value of N (r.p.s.) is at $N_{max}$ (r.p.s.), we have, $$f_c(\text{MAX}) = \frac{2}{N_{max}} \text{ (Hz)}. \tag{15}$$

Recent gasoline engines have been designed to provide a maximum crankshaft rotation of $15 \times 10^4$ r.p.m. In other words, the ignition frequency of an ignition plug will reach 1,250/second ($\frac{1}{2} \times 15 \times 10^4 \div 60 = 1,250$). Using $15 \times 10^4$ as an example, $N_{max} = 15 \times 10^4 \div 60 = 2,500$ (r.p.s.). In order to obtain at least one explosion within the gate range $\Delta tg$ under the condition of $f_c(\text{MAX})$, it is required that one or more high-voltage pulses $HV_2$ (KV) with a repetition rate of $f_2$ (Hz) be generated in the time range $\Delta tg$. To attain this purpose, the following conditions will be sufficient.

$$\frac{1}{f_2} < \Delta tg \tag{16}$$

$$f_2 > f_c(\text{MAX}). \tag{17}$$

From G in FIG. 5, the upper limit of $\Delta tg$ is $$\Delta tg < \frac{1}{4f_c}. \tag{18}$$

From the formulas (16) and (18), $$\frac{1}{4f_c} > \Delta tg \frac{1}{f_2}. \tag{19}$$

From formulas (12) and (17), $$f_1 \geq f_2 > f_c(\text{MAX}) \tag{20}.$$

Moreover, electron behavior can be accelerated, after the start-up of operation, by regulating $\Delta tg$ shown in G in FIG. 5.

FIG. 6 is a schematic diagram of a comprehensive electronic system for the gasifier in FIG. 3, and an apparatus for carrying out this invention (in a four-cycle engine) as illustrated in FIG. 4, under the conditions given by formulas (12)~(20). Reference number 41 is a high frequency oscillator having a frequency $f_i$ on the order of $10^8$ Hz and P.A.C.$(T_{g3})_1 \simeq (T_{g3})_s$, for example, represents a power amplifier, whose output to terminals $a_1$ and $a_1'$ (see FIG. 4) for induction heating are electronically controlled to be $(T_{g3})_1 \simeq (T_{g3})_s$. $(T_{gc})$ is the appropriate temperature of $H_2O(g)$ in the gasifier, which is determined in advance. Reference number 42 is an ultrasonic oscillator having a frequency $f_u$ on the order of $2 \times 10^4$ to $10^6$ Hz P.A.C.N. is a power amplifier whose output to terminals U and U' (see FIG. 3) for transducer 15 is electronically controlled in proportion to N(r.p.s.). Reference number 43 is a pulse oscillator having outputs at frequencies $f_1$ and $f_2$, with frequency $f_1 \geqq f_2$ and with frequency $f_2$ being on the order of at least 3 KHz. P.A.m.$G_1$, for example, represents a power amplifier whose output is electronically modulated by gate $G_1$. Reference number 44 is a trigger pulse generator responsive to the distributor cam contact for gate modulation.

Electric power, both for the pre-starting through the start-up stages and for the post-starting, is supplied from a battery (not illustrated); after start-up, a charging generator (not illustrated) is operated for power generation. The voltage of the power generated is kept constant by a voltage regulator (not illustrated) to avoid overcharging, and an automatic current breaker (not illustrated) checks backflow of the current from the battery to the generator. Other similar mechanisms such as these and the operation thereof as provided for in conventional engines are omitted from the drawings.

In the apparatus illustrated in FIG. 4 for carrying out this invention, it is not necessarily required that all the $H_2O(g)$ taken in be atomized for a complete dissociation. The method according to this invention is designed to increase the concentration of reactional free radicals in the energy-raised plasma which is produced from the $H_2O(g)$ at the first and second steps, then to produce plasma of high electron temperature using periodic impulses by time gate modulation at the final step, and further to make a plasma jet of as high as several thousand degrees Kelvin (°K.) locally, this jet being subjected to explosion by means of synchronized compression. Accordingly, it is very important to provide the thermal pinch effect and magnetic pinch effect sufficiently in the plasma jet. For the purpose of the above operation, it is necessary to cause the plasma to contract by lowering the peripheral temperature of the plasma with the influx of $H_2O(g)$ taken in (refer to the previous description on the pinch effects). Consequently, it is preferable to leave in the plasma some $H_2O(g)$, for it helps to raise the inner temperature of the plasma jet.

Another merit of leaving some $H_2O(g)$ in the plasma is that $H_2O(g)$ molecules provide a kind of catalytic effect to facilitate the reaction of hydrogen and oxygen. As shown in formula (1), in the oxygen/hydrogen reaction, the calorific value per gram is more than twice that of gasoline's. In the case of the exemplified engine for the present invention shown in FIG. 4, the particular design determines what percentage of mechanical energy obtained after start-up can be utilized for charging the generator to supplement the battery, and what percentage can be utilized as mechanical energy for the planned usage of the engine, so with respect to usage of the energy obtained various designs can be implemented.

Figure 7:
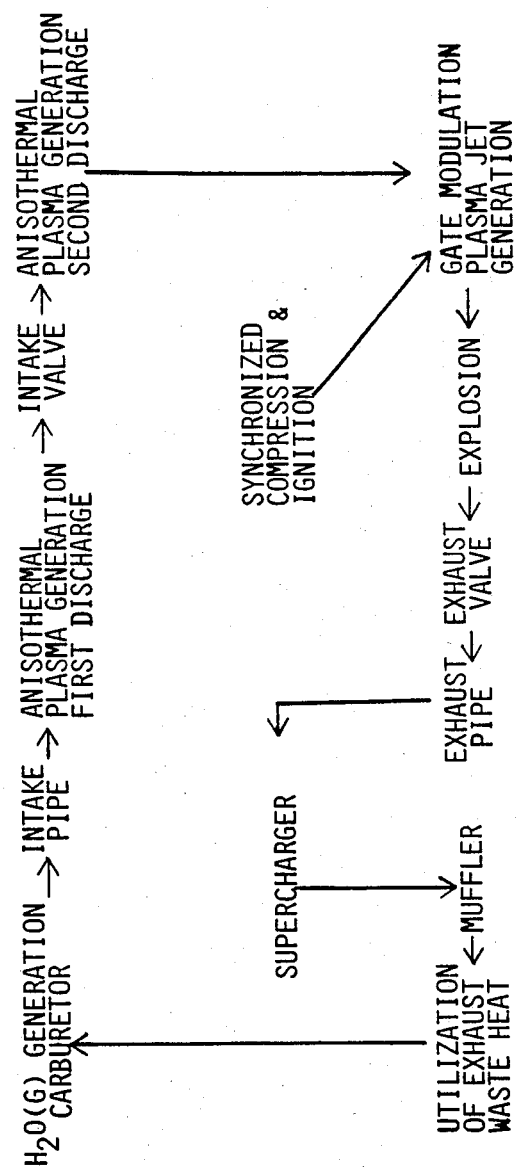
FIG. 7 is a system flow chart of a method in accordance with the present invention.

In the method according to the present invention, a cycle system as shown in FIG. 7 can be tightly insulated from the outer air. It follows therefore that the principle is applicable to plasma jet propulsion in space.

The method of this invention, and the above illustrated structure, can depend upon water alone, dispensing with oil fuel or even oxygen from the air as well as hydrogen or oxygen containers, to take out mechanical energy in a form of periodically repeated explosions in plasma generated via a plurality of steps. The method further enjoys the epochmaking advantage of being free from environmental pollution and, when used in internal combustion engines and others, will greatly contribute not only to industry, but to society as a whole.

As this invention may be embodied in several forms without departing from the spirit of essential characteristics thereof, it is to be understood that the invention is not limited to the specific embodiments thereof except as defined in the appended claims.

What is claimed is:

1. A method of obtaining mechanical energy utilizing $H_2O$ - plasma generated in multiple steps, which comprises: a first step of generating $H_2O$ gas using a gasifier, and transforming the $H_2O$ gas to a plasma using an electric discharge, said plasma having a state of energy; a second step of intensifying the state of energy of the plasma of the first step, to a level such that the plasma with the intensified state of energy is ready to generate a plasma jet, by using high voltage to produce a more intensified electrical discharge than that in the first step and by high-frequency induction heating; and a third step of generating an ultra-high temperature plasma jet by exposing the plasma of the second step to periodic modulation of the high voltage for the second electrical discharge, and causing a high-pressure thermal explosion reaction by compression of the ultra-high temperature plasma jet in synchronization with the modulation, and thereby converting the energy produced by a plasma reaction at the ultra-high temperature in the plasma jet into mechanical energy.

2. A method of obtaining mechanical energy utilizing $H_2O$ - plasma, as recited in claim 1, wherein said first step comprises vaporizing $H_2O$ liquid using ultrasonic vibration and induction heating.

3. A method of obtaining mechanical energy utilizing $H_2O$ - plasma, as recited in claim 1, wherein the modulation of the high voltage, the compression of the plasma jet in synchronization therewith, and the generation of the plasma jet in the third step comprise selectively inputting external signals having appropriate phase and pulse height to cause a final explosion.

4. A method of obtaining mechanical energy utilizing $H_2O$ - plasma, as recited in claim 2, wherein the modulation of the high voltage, the compression of the plasma jet in synchronization therewith, and the generation of the plasma jet in the third step comprise selectively inputting external signals having appropriate phase and pulse height to cause a final explosion.

5. A method of obtaining mechanical energy utilizing $H_2O$ - plasma, as recited in claim 3, wherein the inputting of external signals is automatically performed in response to a repeated movement of a mechanical device which is driven by energy generated in the plasma reaction.

6. A method of obtaining mechanical energy utilizing $H_2O$ - plasma, as recited in claim 4, wherein the inputting of external signals is automatically performed in response to a repeated movement of a mechanical device which is driven by energy generated in the plasma reaction.

* * * * *

UNITED STATES PATENT AND TRADEMARK OFFICE
CERTIFICATE OF CORRECTION

PATENT NO.   : 4,625,681
DATED        : December 2, 1986
INVENTOR(S)  : Uozumi SUTEKIYO It is certified that error appears in the above-identified patent and that said Letters Patent is hereby corrected as shown below:

Column 5, line 46, "$T_e > $ ion" should be --$T_e \gg $ ion--.

Column 5, line 47, "$T_i \simeq $ gas" should be --$T_i \gtrsim $ gas--.

Column 6, equation (13), "$r_1 > r_2$" should be --$r_1 \gg r_2$--.

Signed and Sealed this

Thirtieth Day of May, 1989

Attest:

DONALD J. QUIGG

*Attesting Officer*   Commissioner of Patents and Trademarks